United States Patent
Dai et al.

(10) Patent No.: US 12,307,663 B2
(45) Date of Patent: May 20, 2025

(54) METHOD, DEVICE AND APPARATUS FOR DIFFERENTIATING ARTERIES AND VEINS OF RETINAL VESSELS

(71) Applicant: BEIJING ZHENHEALTH TECHNOLOGY CO., LTD., Beijing (CN)

(72) Inventors: Liming Dai, Beijing (CN); Hongyang Jiang, Beijing (CN); Dongdong Zhang, Beijing (CN); Lei Yu, Beijing (CN)

(73) Assignee: BEIJING ZHENHEALTH TECHNOLOGY CO., LTD., Beijing (CN)

( * ) Notice: Subject to any disclaimer, the term of this patent is extended or adjusted under 35 U.S.C. 154(b) by 64 days.

(21) Appl. No.: 17/755,560

(22) PCT Filed: Aug. 13, 2021

(86) PCT No.: PCT/CN2021/112487
§ 371 (c)(1),
(2) Date: May 2, 2022

(87) PCT Pub. No.: WO2022/033580
PCT Pub. Date: Feb. 17, 2022

(65) Prior Publication Data
US 2024/0177299 A1    May 30, 2024

(30) Foreign Application Priority Data
Aug. 14, 2020   (CN) .......................... 202010815698.8

(51) Int. Cl.
*G06T 7/00* (2017.01)
*G06T 7/136* (2017.01)
*G06T 7/62* (2017.01)

(52) U.S. Cl.
CPC ............ *G06T 7/0012* (2013.01); *G06T 7/136* (2017.01); *G06T 7/62* (2017.01); *G06T 2207/30041* (2013.01); *G06T 2207/30101* (2013.01)

(58) Field of Classification Search
CPC ......... G06T 7/0012; G06T 7/136; G06T 7/62; G06T 2207/30041; G06T 2207/30101
(Continued)

(56) References Cited

U.S. PATENT DOCUMENTS 9,089,288 B2 *   7/2015   You .......................... A61B 3/12
2004/0230124 A1  11/2004  Querfurth
(Continued)

FOREIGN PATENT DOCUMENTS

CN    101999885    4/2011
CN    108073918    5/2018
(Continued)

OTHER PUBLICATIONS

Automated Measurement of Arteriolar-to-Venular Diameter Ratio in Retinal Fundus Imaging, Guo Ying, Liu Zhenyu, Qi Jiajun, dated Aug. 13, 2015, 7 pages, (2015).

*Primary Examiner* — Juan A Torres
(74) *Attorney, Agent, or Firm* — Gunther J. Evanina; BUTZEL

(57) ABSTRACT

A method, device and apparatus for differentiating arteries and veins of retinal vessels are provided. The method includes acquiring a vessel extraction image, a fundus image, and optic disc center coordinate; extracting a main vessel according to the vessel extraction image, the fundus image and the optic disc center coordinate to obtain a main vessel image, and intercepting the main vessel based on the main vessel image to obtain multiple single vessel segments; measuring diameters of the multiple single vessel segments
(Continued)

to obtain diameter sizes of the multiple single vessel segments, obtaining multiple artery-vein vessel pairs according to the diameter sizes.

13 Claims, 13 Drawing Sheets

(58) Field of Classification Search
USPC .......................................................... 382/128
See application file for complete search history.

(56) References Cited

U.S. PATENT DOCUMENTS

| | | |
|---|---|---|
| 2008/0140192 A1 | 6/2008 | Humayun et al. |
| 2012/0195481 A1* | 8/2012 | Gonzalez Penedo ........................ G06T 7/0012 382/128 |
| 2012/0236259 A1* | 9/2012 | Abramoff ............ A61B 3/0016 351/246 |
| 2014/0294235 A1* | 10/2014 | Ishida .................. G06V 40/193 382/103 |
| 2015/0104087 A1* | 4/2015 | Katuwal .................... G06T 7/11 382/128 |
| 2020/0034669 A1* | 1/2020 | Ordonez ................ G06V 10/82 |

FOREIGN PATENT DOCUMENTS

| | | | | |
|---|---|---|---|---|
| CN | 108765418 | | 11/2018 | |
| CN | 110874597 | | 3/2020 | |
| CN | 111681242 | | 9/2020 | |
| JP | H10243924 A | * | 9/1998 | |
| JP | 2007097740 A | * | 4/2007 | |
| WO | WO-2008010305 A1 | * | 1/2008 | ............... A61B 3/12 |

* cited by examiner

METHOD, DEVICE AND APPARATUS FOR DIFFERENTIATING ARTERIES AND VEINS OF RETINAL VESSELS

CROSS REFERENCE TO RELATED APPLICATION(S)

This patent application is a national stage of International Application No. PCT/CN2021/112487, filed on Aug. 13, 2021, which claims priority to Chinese Patent Application No. 202010815698.8 filed with the China National Intellectual Property Administration (CNIPA) on Aug. 14, 2020, and entitled "METHOD, DEVICE AND APPARATUS FOR DIFFERENTIATING ARTERIES AND VEINS OF RETINAL VESSELS". Both of the aforementioned applications are incorporated herein by reference in their entireties.

TECHNICAL FIELD

The present disclosure relates to the technical field of computer-aided diagnosis, and in particular to a method, a device, and an apparatus for differentiating arteries and veins of retinal vessels.

BACKGROUND ART

An artery-to-vein diameter ratio index of fundus retinal vessels is an important reference index for diagnosing arteriosclerotic diseases by physicians. However, the physician still gives an approximate ratio for the artery-to-vein diameter ratio by means of a visual method when reading a film in practice, which is greater than ½, greater than ⅓ and less than ½, less than ⅓, and the like. However, there is a large margin of error in the visual method, especially for new ophthalmologists or general ophthalmologists, who inevitably make misjudgments in the process of reading films. Therefore, accurate measurement of the artery-to-vein diameter ratio of the retinal main vessel by a computer is greatly helpful for the physicians to clinically diagnose arteriosclerosis, and the film reading efficiency of the physicians can be effectively improved. In addition, it is also of great significance for further achieving computer-aided diagnosis of diseases with abnormal vascular morphology such as atherosclerosis.

A method for differentiating arteries and veins of retinal vessels based on a machine learning method has the problem of poor algorithm generalizability and robustness.

SUMMARY

To this end, the present disclosure provides a method for differentiating arteries and veins of retinal vessels, including the following steps:
  acquiring a vessel extraction image, a fundus image, and an optic disc center coordinate;
  extracting a main vessel according to the vessel extraction image, the fundus image and the optic disc center coordinate to obtain a main vessel image, and intercepting the main vessel based on the main vessel image to obtain multiple single vessel segments.
  measuring diameters of the multiple single vessel segments to obtain diameter sizes of the multiple single vessel segments, and obtaining multiple artery-vein vessel pairs according to the diameter sizes;
  eliminating unqualified artery-vein vessel pairs from the multiple artery-vein vessel pairs, and reserving qualified artery-vein vessel pairs;

where the eliminating unqualified artery-vein vessel pairs includes the following steps.
  Acquiring an average image brightness of single vessel segments in each artery-vein vessel pairs, and eliminating the unqualified artery-vein vessel pairs from the artery-vein vessel pairs according to the average image brightness for each artery-vein vessel pair.

In a possible implementation, the method further includes steps of eliminating unqualified artery-vein vessel pairs from the multiple artery-vein vessel pairs and reserving the qualified artery-vein vessel pairs.

Where eliminating unqualified artery-vein vessel pairs include the following steps.
  Acquiring an average image brightness of single vessel segments in each artery-vein vessel pairs, and eliminating the unqualified artery-vein vessel pairs from the artery-vein vessel pairs according to the average image brightness for each artery-vein vessel pair.

In a possible implementation, extracting a main vessel according to the vessel extraction image, the fundus image and the optic disc center coordinate includes the following steps.
  Removing disconnected vessels in the vessel extraction image to obtain a largest connected vessel;
  extracting a vascular skeleton according to the connected vessels;
  extracting cross points of the vessels according to the vascular skeleton and removing the cross points; and
  removing small vessel segments and non-main vessel branches of the vascular skeleton according to the optic disc center coordinate and the fundus image to obtain the main vessel.

Where during the extracting a vascular skeleton according to the connected vessel, using a skeleton extraction function in OpenCV to extract the vascular skeleton from the connected vessels.

In a possible implementation, eliminating unqualified artery-vein vessel pairs further includes the following steps.
  Acquiring an included angle between an artery vessel and a vein vessel in a pair of vessels of various artery-vein vessel pairs, and eliminating the unqualified artery-vein vessel pairs from the multiple artery-vein vessel pairs according to the included angles for each artery-vein vessel pair; and
  acquiring a distance between the artery vessel and the vein vessel in the pair of vessels of various artery-vein vessel pairs, and eliminating the unqualified artery-vein vessel pairs from the multiple artery-vein vessel pairs according to the distance for each artery-vein vessel pair.

In a possible implementation, extracting cross points of the vessels according to the vascular skeleton and removing the cross points includes the following steps.
  Performing binarization on the vascular skeleton to obtain a gray-scale image;
  traversing the gray-scale image with a 3×3 template, and extracting the cross points in the gray-scale image through an enumeration method; and
  setting values of pixels within a circle having a radius of four pixel points and a center at each cross point, to 0.

In a possible implementation, removing the small vessel segments and non-main vessel branches of the vascular skeleton according to the optic disc center coordinate and the fundus image to obtain a main vessel includes the following steps.
  Connecting the optic disc center coordinate and a macular region of the fundus image to obtain a connection line as a positive half-axis;

reserving a region from 110° in a clockwise direction relative to the positive half-axis to 110° in a counter-clockwise direction relative to the positive half-axis; and refining the gray-scale image by adopting 3×3 ELLIPSE to obtain the main vessel.

In a possible implementation, intercepting the main vessel based on the main vessel image to obtain multiple single vessel segments includes the following steps.

Traversing outwards from a circle center at the optic disc center coordinate within a predetermined radius at a predetermined step, to intercept the main blood vessel to obtain multiple small blood vessel segments;

performing convex hull detection on the multiple small vessel segments to obtain multiple smooth vessel segments;

removing multiple smooth vessel segments with curvatures greater than a predetermined curvature threshold value from the multiple smooth vessel segments to obtain straight-line vessel segments;

detecting the straight-line vessel segments by use of a rectangular detection API in OpenCV to obtain vessel angles; and obtaining the multiple single vessel segments according to a predetermined angle range.

In a possible implementation, measuring diameters of the multiple single vessel segments to obtain diameter sizes of the multiple single vessel segments, and obtaining multiple artery-vein vessel pairs according to the diameter sizes includes the following steps.

Obtaining a center line of each single vessel segment, and extending a center point of the center line towards two ends of the single vessel segment by a predetermined pixel to obtain a center line segment;

computing equations of vertical lines at two end points of the two center line segment;

performing straight-line fitting on one contour line of the single vessel segment between the vertical line to obtain a first straight-line;

performing straight-line fitting on another contour line by use of a least square method based on a slope of the first straight-line to obtain a second straight-line;

computing a distance between the first straight-line and the second straight-line to obtain a vessel diameter;

selecting a single vessel segment with a maximum diameter in the multiple single vessel segments as a vein; and computing a distance between the vein to other single vessel segments, and selecting a single vessel segment closest to the vein as an artery.

According to another aspect of the present disclosure, a device for differentiating arteries and veins of retina vessels is provided. The device includes:

a data acquisition module, configured to acquire a vessel extraction image, a fundus image, and an optic disc center coordinate;

a vessel screening module, configured to extract a main vessel according to the vessel extraction image, the fundus image and the optic disc center coordinate to obtain a main vessel image, and intercept the main vessel based on the main vessel image to obtain multiple single vessel segments; and an artery-vein vessel pair selecting module, configured to measure diameters of the multiple single vessel segments to obtain diameter sizes of the multiple single vessel segments, and obtain multiple artery-vein vessel pairs according to the diameter sizes; and eliminate unqualified artery-vein vessel pairs from the multiple artery-vein vessel pairs, and reserve qualified artery-vein vessel pairs.

Where eliminate unqualified artery-vein vessel pairs includes the following steps.

Acquiring an average image brightness of single vessel segments in each artery-vein vessel pair, and eliminating the unqualified artery-vein vessel pairs from the artery-vein vessel pairs according to the average image brightness for each artery-vein vessel pair.

According to another aspect of the present disclosure, an apparatus for differentiating arteries and veins of retinal vessels is provided, including:

a processor; and a memory for storing instructions executable by the processor.

Where the processor is configured to achieve any of the methods mentioned above when executing the executable instructions.

By acquiring the vessel extraction image, the fundus image and the optic disc center coordinate, the main vessel is extracted based on the vessel extraction image, the fundus image and the optic disc center coordinate to obtain the main vessel image, and the main vessel is intercepted based on the main vessel image to obtain multiple single vessel segments, and diameters of the multiple single vessel segments are measured to obtain diameter sizes of various single vessel segments, and the multiple artery-vein vessel pairs are obtained by selecting according to the various diameter sizes. Therefore, the test effect on a fundus retina color image in an actual scene is excellent, the better effect for the fundus images of different types, different brands and different grades of image quality is achieved, the algorithm robustness and universality are high, and the possibility for applying artery and vein differentiation of retinal vessels and a diameter measurement algorithm into actual scene is provided.

Exemplary embodiments are described in detail below with reference to the accompanying drawings, and other features and aspects of the present disclosure will become clear.

BRIEF DESCRIPTION OF THE DRAWINGS

The accompanying drawings, which are incorporated in and constitute a part of the specification, illustrate exemplary embodiments, features, and aspects of the present disclosure, together with the description, and serve to explain the principles of the present disclosure.

DETAILED DESCRIPTION OF THE EMBODIMENTS

Figure 1:
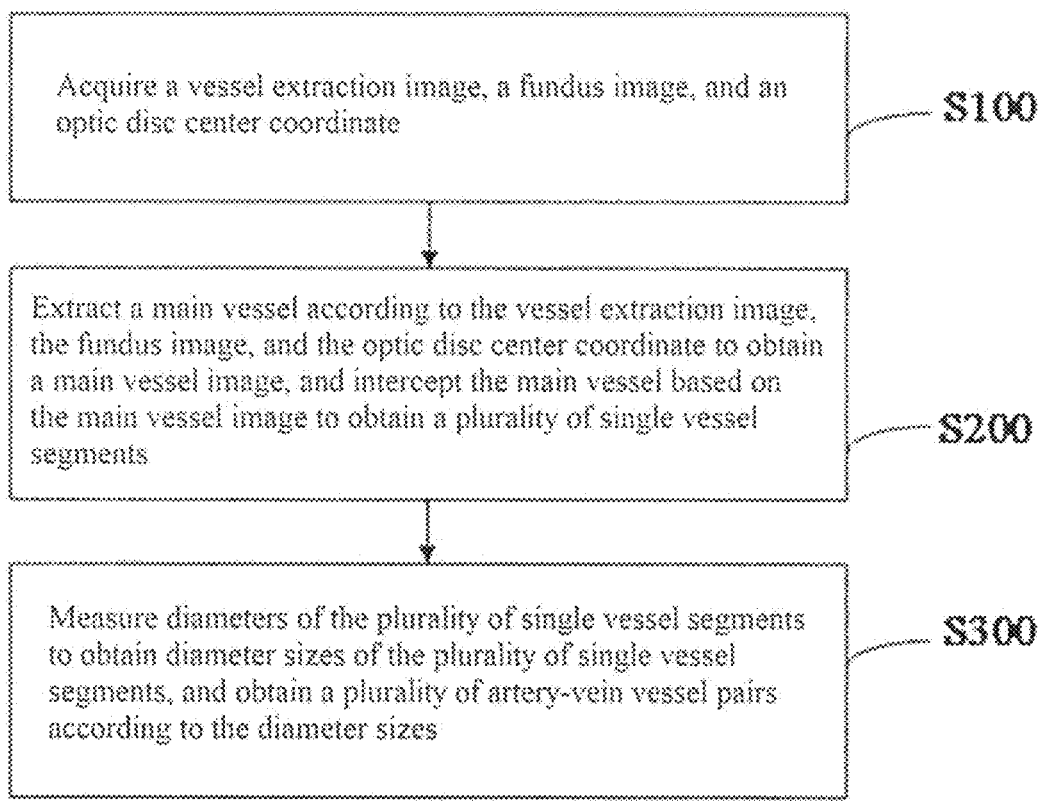
FIG. 1 illustrates a flow diagram of a method for differentiating arteries and veins of retinal vessels in accordance with an embodiment of the present disclosure.

Various exemplary embodiments, features and aspects of the present disclosure are described in detail below with reference to the accompanying drawings. Like reference numerals in the drawings indicate functionally like or similar elements. While the various aspects of the embodiments are illustrated in the accompanying drawings, it is not necessary to draw the accompanying drawings to scale unless specifically indicated.

The word "exemplary" used herein means "serving as an example, an embodiment, or illustration." Any embodiment described herein as "exemplary" is not necessarily to be construed as preferred or advantageous over other embodiments.

In addition, numerous specific details are given in the specific embodiments below to better illustrate the present disclosure. Those skilled in the art should understand that the present disclosure may be implemented as well without some specific details. In some embodiments, methods, means, elements and circuits known to those skilled in the art are not described in detail in order to highlight the primary intention of the present disclosure.

FIG. 1 illustrates a flow diagram of a method for differentiating arteries and veins of retinal vessels in accordance with an embodiment of the present disclosure. As shown in FIG. 1, the method for differentiating the arteries and the veins of the retinal vessels includes steps S100 to S300.

In step S100, a vessel extraction image, a fundus image, and a center coordinate of the optic disc are acquired. In step S200, a main vessel is extracted according to the vessel extraction image, the fundus image and the center coordinate of the optic disc to obtain a main vessel image, and the main vessel is intercepted based on the main vessel image to obtain multiple single vessel segments. In step S300, diameters of the multiple single vessel segments are measured to obtain diameter size of each of the single vessel segments, and multiple artery-vein vessel pairs are obtained according to the diameter sizes.

By acquiring the vessel extraction image, the fundus image and the center coordinate of the optic disc, the main vessel is extracted based on the vessel extraction image, the fundus image and the optic disc center coordinate to obtain the main vessel image, and the main vessel is intercepted based on the main vessel image to obtain multiple single vessel segments, and diameters of the multiple single vessel segments are measured to obtain diameter sizes of single vessel segments, and the multiple artery-vein vessel pairs are obtained according to the diameter sizes. Therefore, the test effect on a fundus retina color image in an actual scene is excellent, the better effect for the fundus images of different types, different brands and different grades of image quality is achieved, the algorithm robustness and universality are high, and it is possible to apply artery and vein differentiation of retinal vessels and diameter measurement to actual scene.

Firstly, it needs to be noted that the method for differentiating the arteries and the veins of the retinal vessels is achieved based on machine learning. Where, in the method for differentiating the arteries and the veins of the retinal vessels corresponding to an embodiment of the present disclosure, the acquisition of the vessel extraction image and the optic disc center coordinate may be achieved by using a corresponding network model.

Specifically, the vessel extraction image may be acquired by using a U-net network, and the optic disc center coordinate may also be acquired by using the U-net network.

Before acquiring the vessel extraction image and the optic disc center coordinate by using the U-net network, the adopted network model needs to be firstly trained to obtain a final converged network structure.

Figure 6:
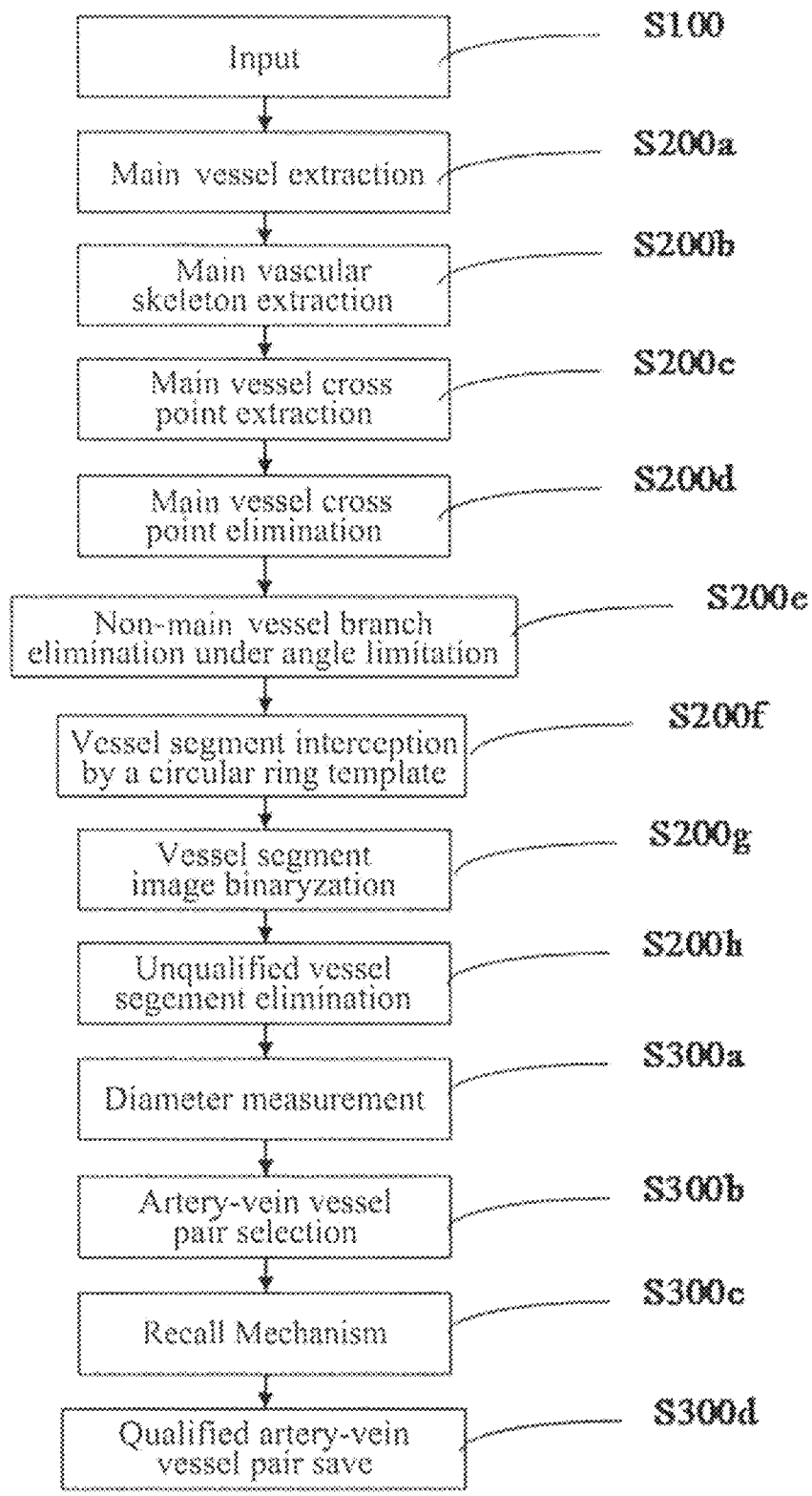
FIG. 6 illustrates a flow diagram of another method for differentiating arteries and veins of retinal vessels in accordance with an embodiment of the present disclosure.
Figure 7:
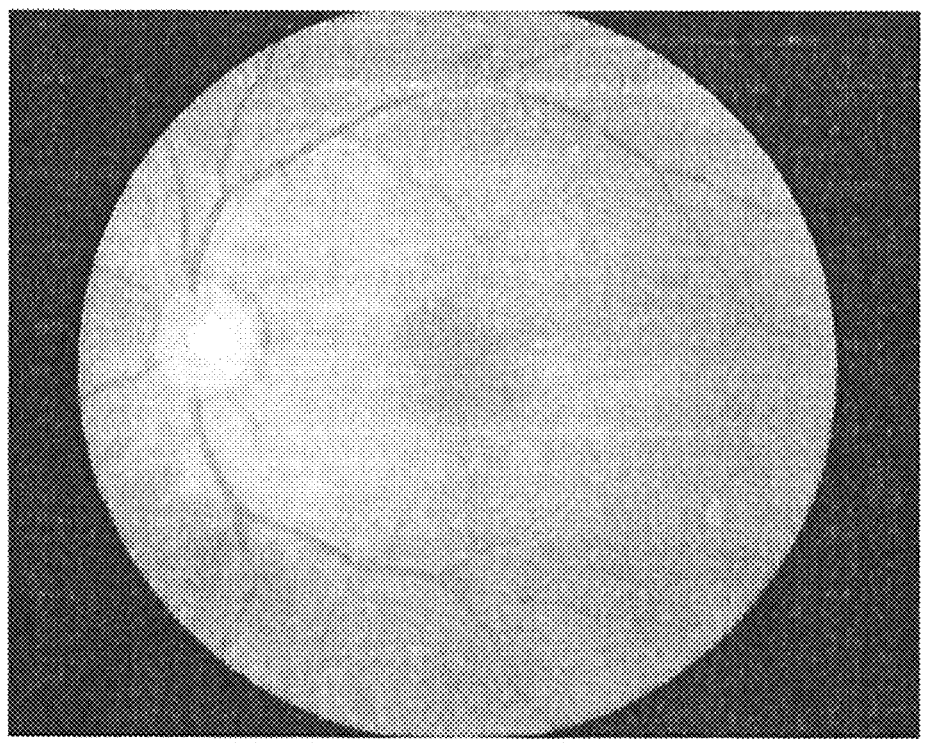
FIG. 7 illustrates a schematic diagram of a fundus image in the method for differentiating arteries and veins of retinal vessels in accordance with an embodiment of the present disclosure.
Figure 8:
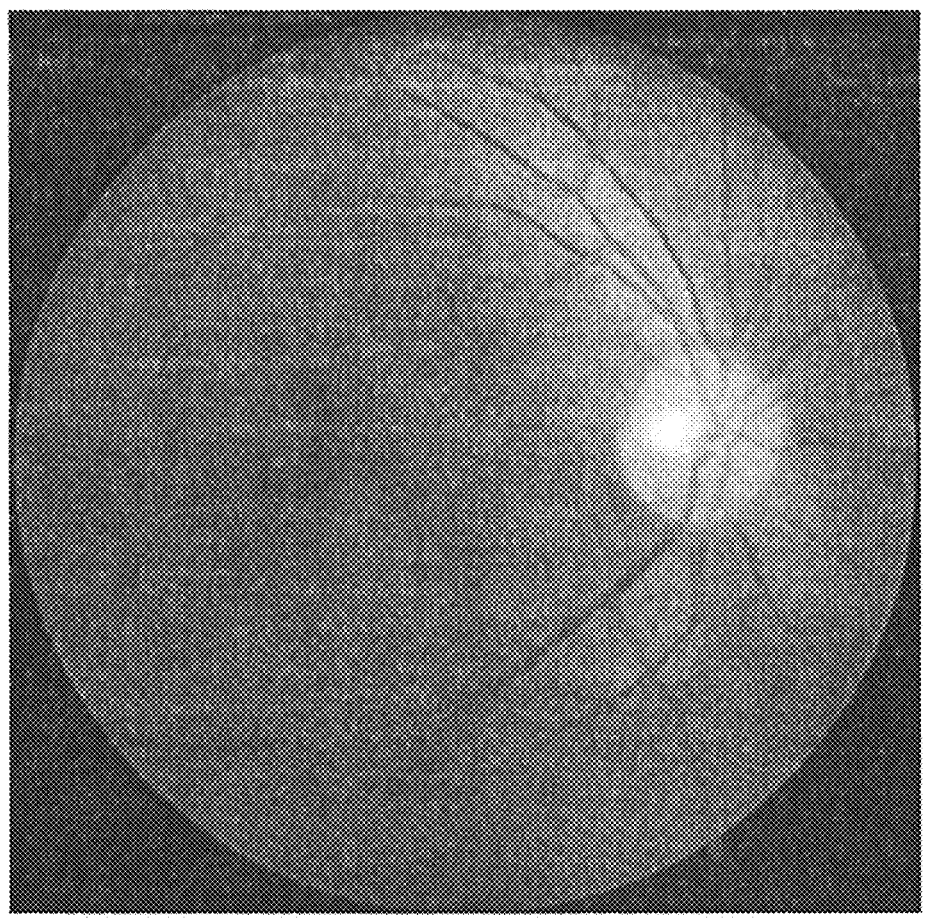
FIG. 8 illustrates a schematic diagram of an optic disc detection test image in the method for differentiating arteries and veins of retinal vessels in accordance with an embodiment of the present disclosure.
Figure 9:
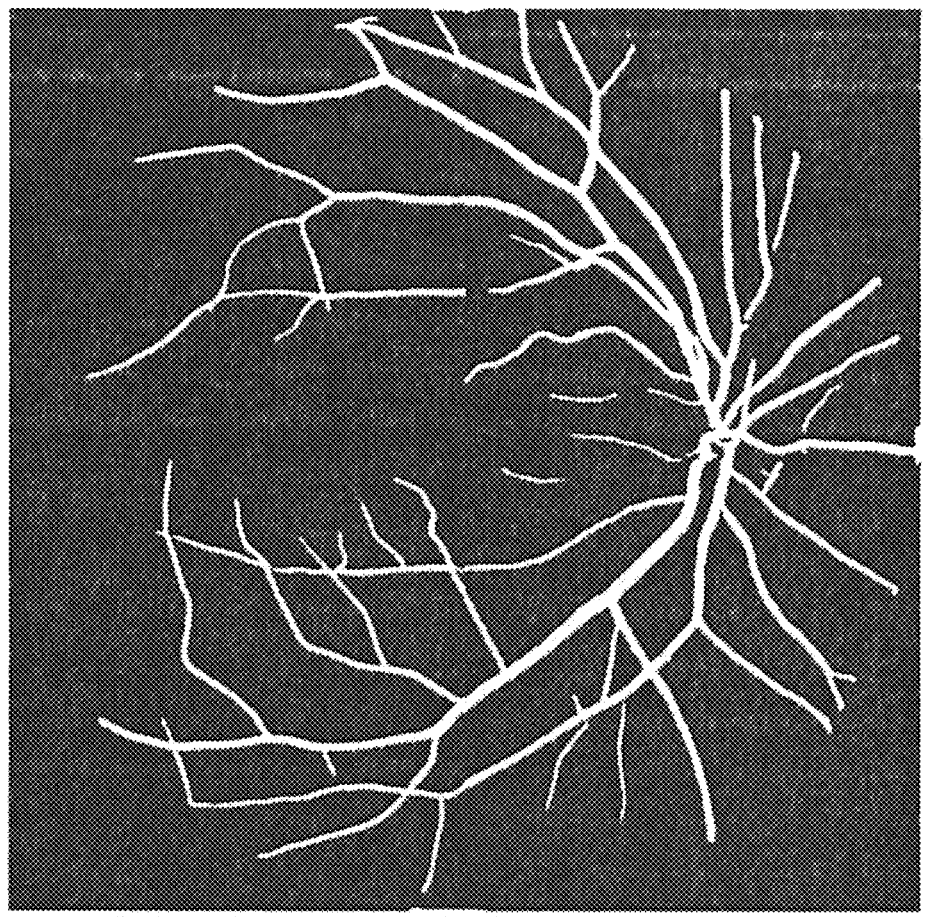
FIG. 9 illustrates a schematic diagram of an optic disc detection test result image in the method for differentiating arteries and veins of retinal vessels in accordance with an embodiment of the present disclosure.

Where, when training the adopted network model, training data sets for vessel extraction and optic disc detection are constructed firstly. In the construction of the training data set for vessel extraction, a validation set including 18 pieces of pictures, a training set including 20 pieces of pictures, which is a total of 3004 pieces after data amplification, and a testing set including 2 pieces of pictures all derived from a published DRIVE data set and in 565×584 pixels are used. In the construction of the training data set for optic disc detection, the training set includes 800 pieces of pictures from refuge 2018 training set and verification set, 50 pieces of pictures from drishti-gs1 training data sets, 159 pieces of pictures from rim-one-r3 training data sets, a total of 4036 pieces after data amplification. The test set includes 400 pieces of pictures from refuge 2018 testing set, and 51 pieces of pictures from drishti-gal testing set, a total of 451 pieces. Further, in a vessel extraction layer, black side cutting is firstly conducted on the training data sets, and then a G channel is extracted, image enhancement is conducted by use of Contrast Limited Adaptive histogram equalization (CLAHE), then normalization is conducted. The image is subjected to horizontal inversion, contrast adjustment and random cutting, the number of pictures in the training data set is amplified to 3004 pieces. A network structure for model training of the vessel extraction layer is U-net, the size of input picture is 512×512, an optimization method is Adam, a learning rate is 0.0001, Batch_size is 2, a loss function is dice_lose, the number of training is 150 epoch, and an early-stopping mechanism is added. An image for model testing is as shown in FIG. 6, and a result image from model is as shown in FIG. 7. Similar, in an optic disc detection layer, a training set data image is subjected to black edge cutting firstly and then subjected to median filtering, the image is zoomed to the size of 512×512, and then a G channel is extracted, image enhancement is conducted by use of CLAHE, then normalization is conducted, the image is subjected to horizontal inversion and contrast adjustment, the number of pieces in the training data set is amplified to 4036 pieces. The network structure for model training of the optic disc detection layer is U-Net, the size of the input picture is 512×512, an optimization method is Adam, a learning rate is 0.0001, Batch_size is 4, a loss function is dice_lose, the number of training is 150 epoch, and an early-stopping mechanism is added, a model test image is as shown in FIG. 8, and a test result image is as shown in FIG. 9.

After completing the network model training, the trained network model can be configured to acquire the vessel extraction image and the optic disc center coordinate. That is, referring to FIG. 1, step S100 is executed to acquire a vessel extraction image, a fundus image, and an optic disc center coordinate.

Figure 2:
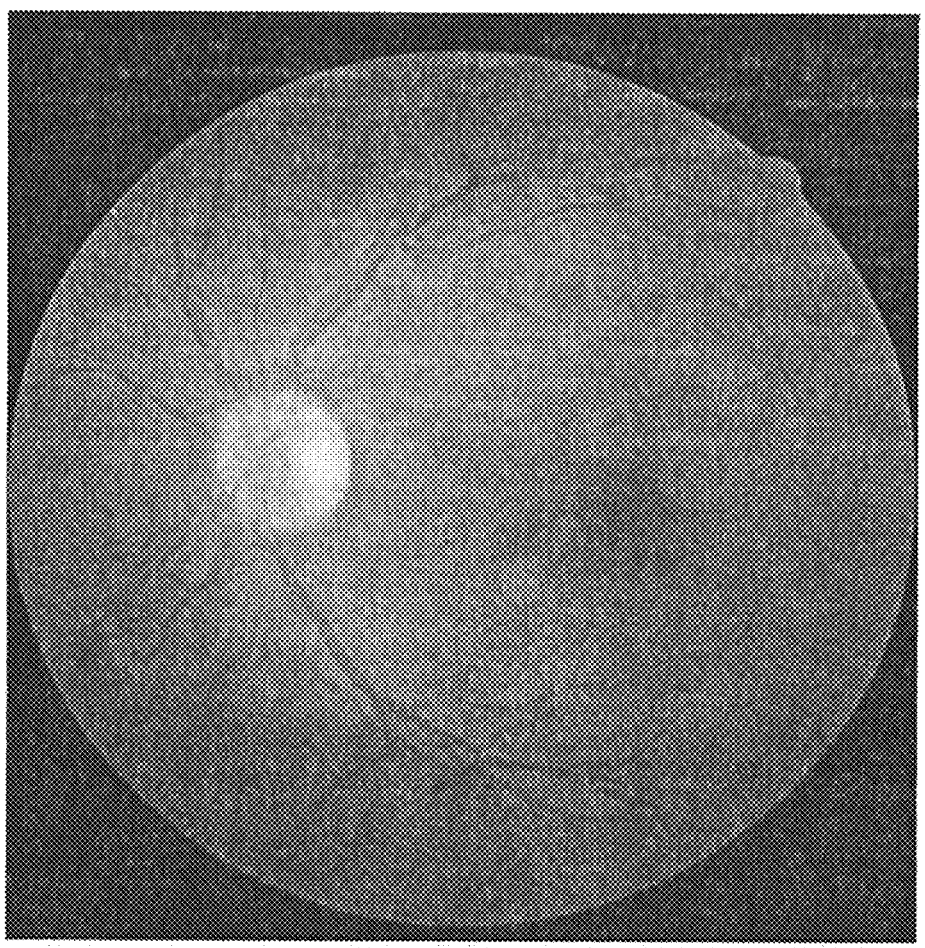
FIG. 2 illustrates a schematic diagram of a 512×512 fundus image in the method for differentiating arteries and veins of retinal vessels in accordance with an embodiment of the present disclosure.
Figure 3:
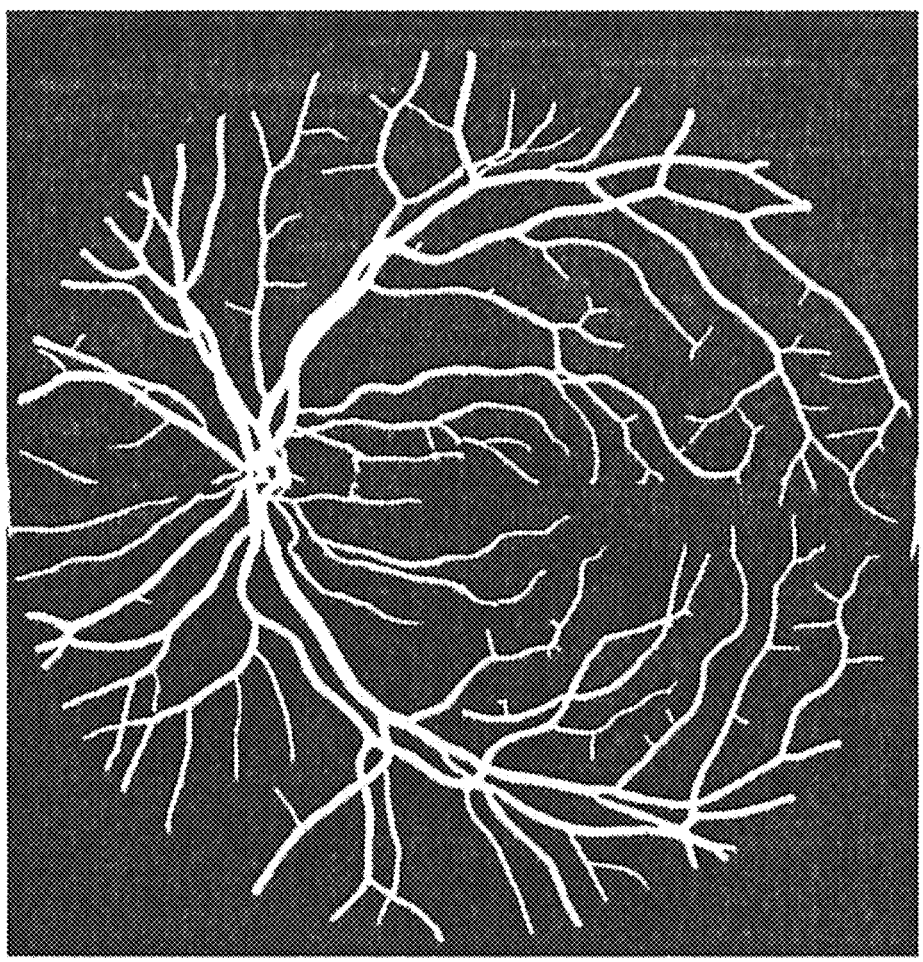
FIG. 3 illustrates a schematic diagram of a 512×512 vessel extraction image in the method for differentiating arteries and veins of retinal vessels in accordance with an embodiment of the present disclosure.
Figure 4:
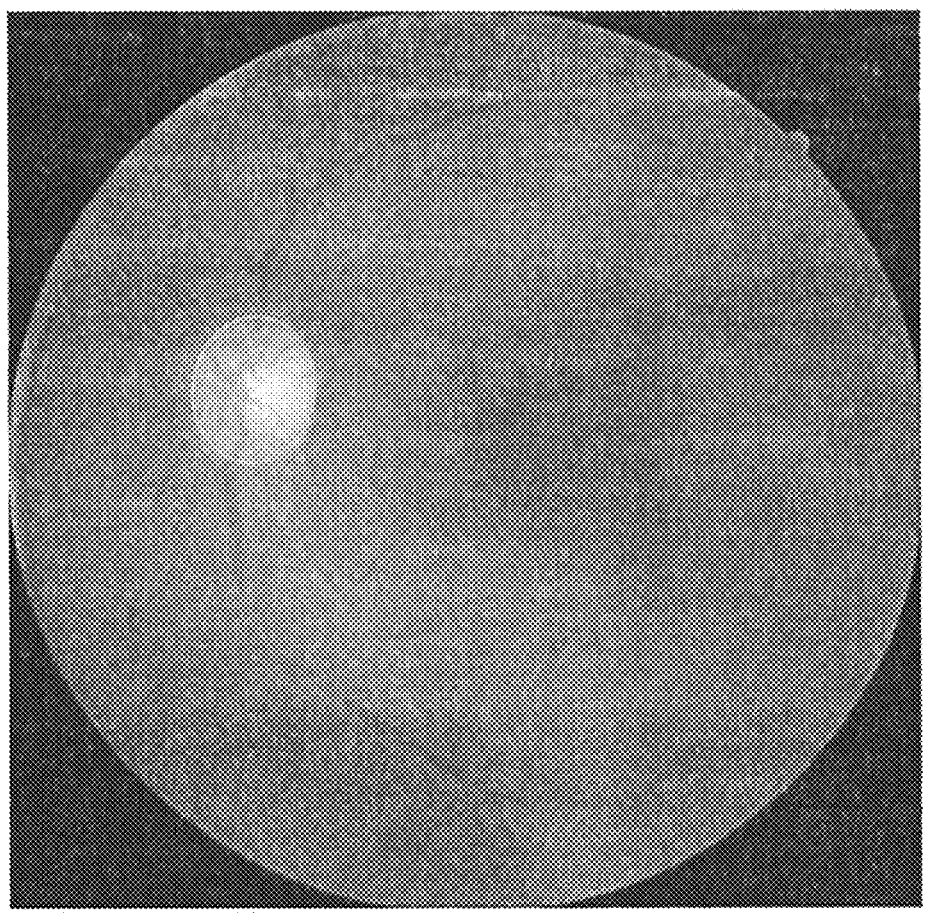
FIG. 4 illustrates a schematic diagram of a vessel extraction test image in the method for differentiating arteries and veins of retinal vessels in accordance with an embodiment of the present disclosure.
Figure 5:
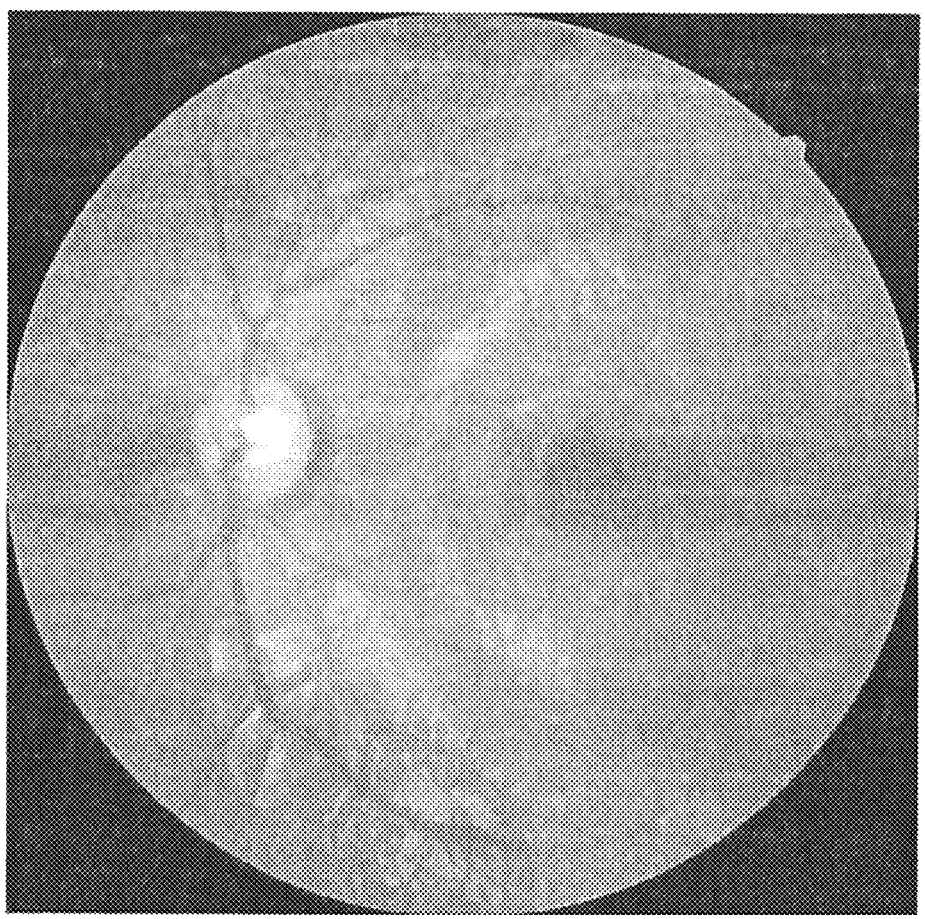
FIG. 5 illustrates a schematic diagram of a vessel extraction test result image in the method for differentiating arteries and veins of retinal vessels in accordance with an embodiment of the present disclosure.

In a possible implementation, a fundus retina color image is firstly input, referring to FIG. 3, after performing preprocessing operation on the fundus retina color image, the fundus retina color image is subjected to vessel extraction and optic disc detection respectively to acquire a vessel extraction result and an optic disc detection result. After completing all above, operations, the preprocessed color fundus image, retinal vessel extraction image and the optic disc coordinate are used as the input to be sent to an artery-vein differentiating module for differentiating the veins and the arteries. For example, referring to FIG. 2, step S100 is executed; referring to FIG. 4 and FIG. 5, a 512×512 colorful retina fundus image subjected to black edge cutting, a 512×512 vessel extraction image and an optic disc center coordinate based on the 512×512 vessel extraction image can be directly obtained according to the vessel extraction result and the optic disc detection result.

Further, referring to FIG. 1, step S200 is executed to extract a main vessel based on the vessel extraction image, the fundus image, and the optic disc center coordinate, to obtain a main vessel image, and to intercept the main vessel based on the main vessel image to obtain multiple single vessel segments.

In a possible implementation, referring to FIG. 2, extracting the main vessel based on the vessel extraction image, the fundus image and the optic disc center coordinate includes the steps of executing step S200a to remove disconnected vessels in the vessel extraction image to obtain the largest connected vessel; executing step S200b to extract a vascular skeleton according to the connected vessels; and executing steps S200c, S200d and S200e to extract cross points of the vessels according to the vascular skeleton and removing the cross points, removing small vessel segments and non-main vessel branches of the vascular skeleton according to the optic disc center coordinate and the fundus image to obtain the main vessel, where the connected vessels are extracted from the vascular skeleton by use of a skeleton extraction function in OpenCV when the vascular skeleton is extracted according to the connected vessels.

Specifically, extracting the cross points of the vessels according to the vascular skeleton and removing the cross points include: performing binarization on the vascular skeleton to obtain a gray-scale image, traversing the gray-scale image with a 3×3 template, and extracting the cross points in the gray-scale image through an enumeration method, and setting values of pixels within a circle having a center located at the cross point and a radius of four pixel to 0.

Further, removing the small vessel segments and non-main vessel branches of the vascular skeleton according to the optic disc center coordinate and the fundus image to obtain the main vessel includes the steps of taking a connecting line of the optic disc center coordinate and a macular region of the fundus image as a positive half axis; reserving a region from 110° in a clockwise direction relative to the positive half-axis to 110° in a counterclockwise direction relative to the positive half axis; and refining the gray-scale image by adopting 3×3 ELLIPSE to obtain the main vessel.

Further, referring to FIG. 2, intercepting the main vessel based on the main vessel image to obtain multiple single vessel segments includes: step S200f, configured for traversing outwards from a circle center at the optic disc center coordinate within a predetermined radius at a preset step length, to intercept the main blood vessel to obtain multiple small blood vessel segments; step S200g, configured for dividing small vessel segments into upward arches and downward arches to guarantee refined elimination; step S200h, configured for performing convex hull detection on the multiple small vessel segments to obtain multiple smooth vessel segments, removing the smooth vessel segments with curvatures greater than a preset curvature threshold from the multiple smooth vessel segments to obtain straight-line vessel segments; detecting the straight-line vessel segments by use of a rectangular detection API in OpenCV to obtain vessel angles; and obtaining multiple single vessel segments according to a preset angle range.

Figure 10:
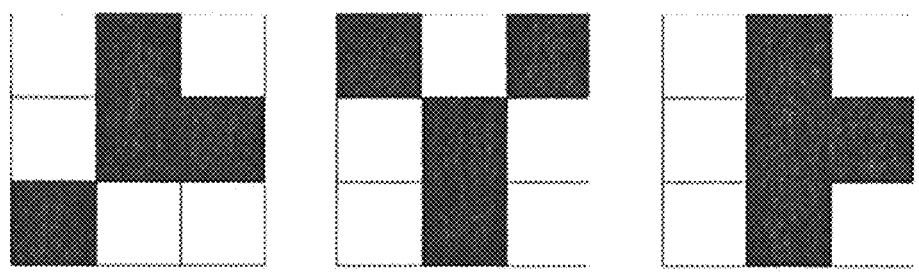
FIG. 10 illustrates a schematic diagram of a vessel trend in the method for differentiating arteries and veins of retinal vessels in accordance with an embodiment of the present disclosure.
Figure 11:
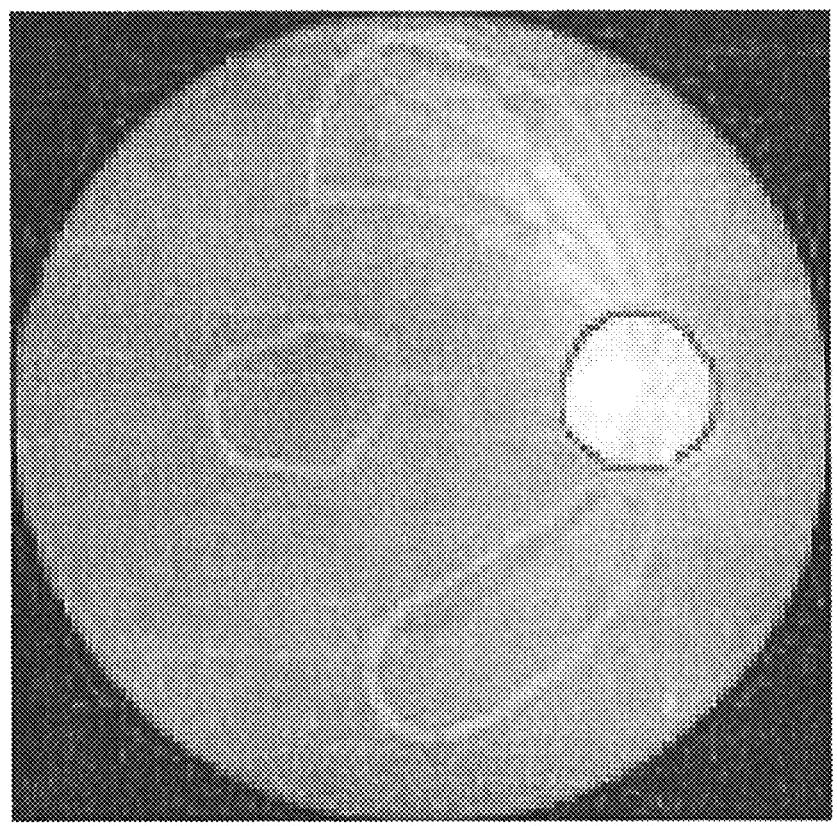
FIG. 11 illustrates a schematic diagram of a macular region in the method for differentiating arteries and veins of retinal vessels in accordance with an embodiment of the present disclosure.
Figure 12:
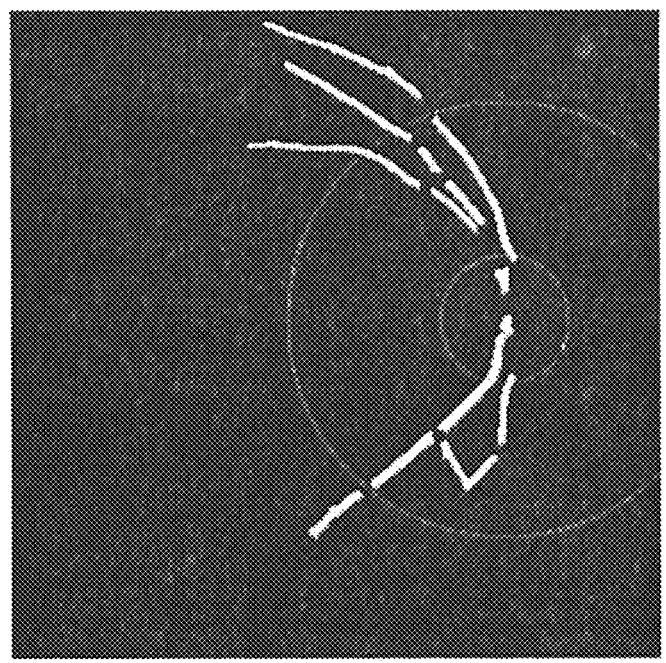
FIG. 12 illustrates a schematic diagram of a circular ring template in the method for differentiating arteries and veins of retinal vessels in accordance with an embodiment of the present disclosure.
Figure 13:
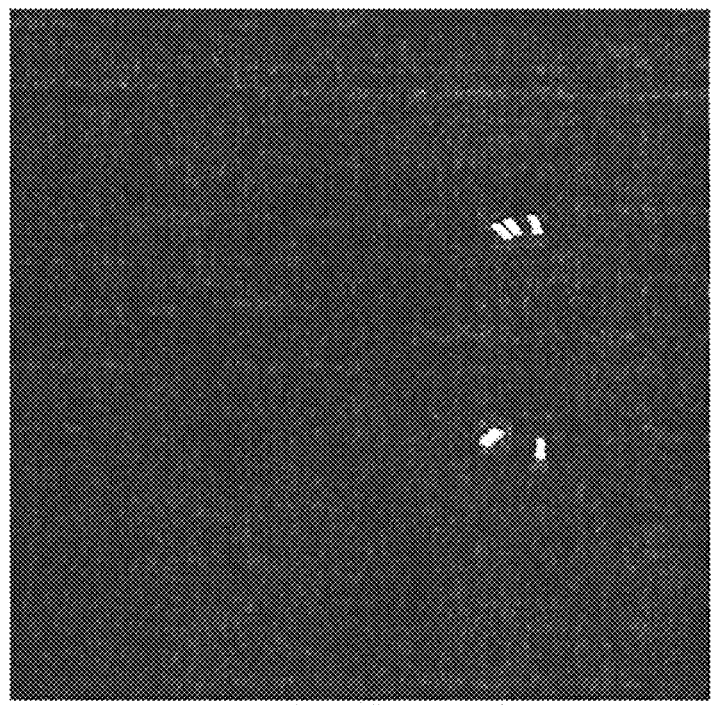
FIG. 13 illustrates a schematic diagram of small vessel segments in the method for differentiating arteries and veins of retinal vessels in accordance with an embodiment of the present disclosure.

Illustratively, when extracting the main vessel, the largest connected vessel in the vessel extraction image is firstly reserved, and then the small vessel branches are gradually eliminated, where the extraction of the vascular skeleton is implemented through a skeleton extraction function skeletonize( ) in an OpenCV morphological operation morphology library, the gray-scale images of the complete vascular skeleton are traversed by use of a 3×3 template. Referring to FIG. 10, due to the fact that the cross points have three types of cross schemes (as shown in the three figures in FIG. 10) and four directions (up, down, left and right directions) for each cross scheme, a total of 12 types of cross points, in a 3×3 region, the extraction of all cross points in the vascular skeleton can be achieved through the enumeration method. The gray-scale image (a vessel binary image) is refined by adopting ELLIPSE type morphological operation Kernel of a size 3×3, and the refined small branch vessels are in states of: being completely corroded and having interruptions. In the case, the primary elimination of the small vessel branches can be achieved in combination with a small region removal operation. Further, due to the fact that all small vessel branches cannot be completely removed in above operation, the cross points of the main vessel are circularly traversed, and the pixel points in the circular region around a cross point in a binary image of the main vessel is set to be 0 by using a circular template with a center at the cross point and a radius of four pixel points, and the gray-scale image (a vessel binary image) in the circular ring region is reserved. The secondary elimination of remaining the small vessel segment branches are implemented through a small region removal operation, and then a reserved image in the circular region around the vessel cross point is filled to an original position to achieve image restoration at the cross point position of the vessel image. Then, referring to FIG. 11, the optic disc center coordinate is selected, the vessels in the region of −110 degrees to +110 degrees are intercepted on a basis of the connecting line of the optic disc center coordinate and the macular area as a positive half-axis of a horizontal axis, the main vessel can be obtained by further eliminating residual non-main blood vessel branches at the side of the optic disc, then the main vessel is traversed outwards with a circular ring region of a ring width equal to a fixed step length and a center at the optic disc center coordinate, to intercept small vessel segments on the main vessel after eliminating the cross points. A complete circular ring interception range is a region enclosed by circular ring as shown in FIG. 12, where a large circular ring denotes a lower border of the circular ring interception range, a small circular ring denotes an upper border of the circular ring interception range, and the small vessel segments intercepted in the circular ring traversing process are as shown in FIG. 13. Further, a convex hull detection needs to be conducted on the small vessel segments, that is, the convex hulls of the extracted small vessel segments are computed, the number of pixel points in convex hull contours and the number of pixel points in the vessel segments are counted, a difference value between the number of pixel points of the convex hull contour and the number of the pixel points of the blood vessel segment are calculated, and a threshold value is set to eliminate irregular vessel segments so as to obtain smooth vessel segments. Where the irregular vessel segments include segment of bifurcation point, segment of burr, segment of extremely irregular vessel shape and the like. Then, center lines of the small blood vessel segments qualified in the convex hull detection, namely smooth vessel segments, are extracted, and then a straight-line fitting operation is conducted on the center lines. Then, distances of the pixel points on the center lines from the fitted straight-line and in turn a cumulative sum and a deviation of the distances are calculated, to set the threshold value, based on which excessively bent small vessel segments are eliminated to obtain straight-line blood vessel segments. The straight-line vessel segment with a vessel trend different from overall vessel trend of the main vessel is eliminated from the main vessel according to condition limitation of the vessel segment trend. Specifically, the angle measurement of each of vessel segments is performed through a rectangular detection API in OpenCV, and the small vessel segments in a range of 5-85 degrees are reserved, i.e., the single vessel segments are obtained. In addition, the vessel segment length limitation may also be applied to eliminate incomplete small vessel segments which are intercepted by the circular ring template and caused by a cross point elimination operation.

Further, step S300 is executed to measure diameters of multiple single vessel segments to obtain diameter sizes of various single vessel segments, and to obtain multiple artery-vein vessel pairs according to the diameter sizes.

In a possible implementation, referring to FIG. 2, step S300a is configured for measuring diameters of the multiple single vessel segments to obtain the diameter sizes of various single vessel segments, and further step S300b is configured for obtaining the multiple artery-vein vessel pairs according to diameter sizes.

Figure 14:
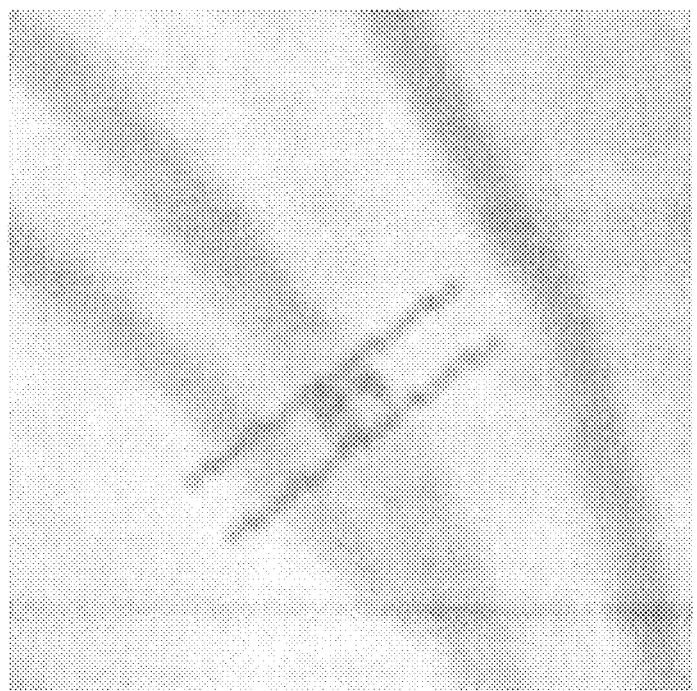
FIG. 14 illustrates a schematic diagram of contour straight-line fitting in the method for differentiating arteries and veins of retinal vessels in accordance with an embodiment of the present disclosure.
Figure 15:
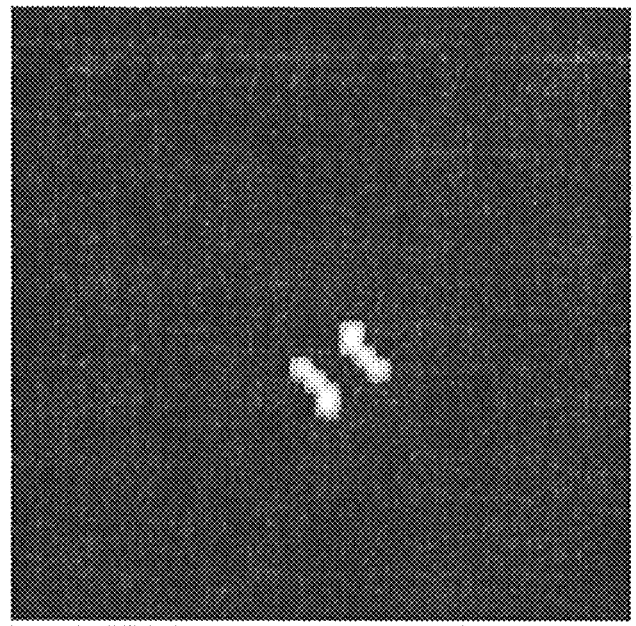
FIG. 15 illustrates a schematic diagram of diameters in the method for differentiating arteries and veins of retinal vessels in accordance with an embodiment of the present disclosure.

Specifically, a center line of each single vessel segment is obtained, and a center point of the center line is extended towards two ends of the center line by a preset pixel, to obtain a center line segment. Equations of vertical lines at two end points of the center line segment are computed, and then straight-line fitting is performed on one contour line of the single vessel segment between the vertical lines to obtain a first straight-line, and further straight-line fitting is performed on another contour line by use of a least square method based on a slope of the first straight-line to obtain a second straight-line. A distance between the first straight-line and the second straight-line are computed to obtain a vessel diameter. Next, a vessel segment with the maximum diameter is selected from the multiple single vessel segments as a vein, the distances between the veins to each of other single vessel segments are computed, and the single vessel segment closest to the vein is selected as an artery. For example, the center line of each the single vessel segment is intercepted on the main vessel by taking the gray-scale image as the template, and the straight-line fitting operation is conducted on the center line. Then the center point position coordinate of the center line of the vessel segment is obtained, the center point extends towards the two sides, and referring to FIG. 14, the center line segment with five-pixel points is reserved. and the equations of vertical lines at two end points of the center line segment of the vessel are computed. Vertical line segments with a fixed length are respectively intercepted on the vertical line, as illuminated in FIG. 14. Further, referring to FIG. 15, contour pixel points of the single vessel segment are intercepted through the two vertical line segments, and one of the two intercepted vessel contours is selected for straight-line fitting. Then, the slope of the straight-line obtained by fitting is fixed, and the straight-line fitting of another contour between the two vertical line segments of the single vessel segment is performed by use of a least square method. So, the diameter measurement may be achieved by computing the distance between the two straight-lines. Next, the single vessel segments are traversed circularly, the diameter values of the single vessel segments are respectively computed, it is assumed that the single vessel segment with the maximum diameter value is a vein, the distances from the center point of the vein vessel segment to the center points of other vessel segments are computed, it is assumed that the single vessel segment closest to the vein vessel segment is an artery, and the two vessel segments form an artery-vein vessel pair, and related data is saved.

It needs to be noted that in selecting the center line segment with five-pixel points, the number of the pixel points, namely five, is set based on the actual vessel segment length, and can be modified according to the actual vessel segment length.

In addition, referring to FIG. 2, step S300c involving a recall mechanism is performed, which further includes the steps of eliminating unqualified artery-vein vessel pairs from multiple artery-vein vessel pairs and reserving qualified artery-vein vessel pairs. The eliminating the unqualified artery-vein vessel pairs includes: acquiring average image brightness of single vessel segments in artery-vein vessel pairs, and eliminating the unqualified artery-vein vessel pairs from the multiple artery-vein vessel pairs according to the average image brightness. For example, through computing the average image brightness of the single vessel segments in the artery-vein vessel pairs identified by an algorithm, if the brightness of an artery vessel is higher than that of a vein vessel, the artery-vein vessel pair is reserved.

It needs to be noted that the algorithm of computing the brightness may use the conventional art, which is not described in detail here.

In a possible implementation, the eliminating unqualified artery-vein vessel pairs further includes: acquiring an included angle between an artery vessel and a vein vessel in a pair of vessels in various artery-vein vessel pairs; eliminating unqualified artery-vein vessel pair from the multiple artery-vein vessel pairs according to the included angle; acquiring a distance between the artery vessel and the vein vessel in the pair of vessels in various artery-vein vessel pairs, and eliminating unqualified artery-vein vessel pair from the multiple artery-vein vessel pairs according to the distance. For example, an angle threshold is set to be 30 degrees to eliminate the situation that an algorithm misjudges a main vessel and a branch vessel thereof as an artery-vein vessel pair, that is, if the included angle between the artery vessel and the vein vessel in the artery-vein vessel pair is greater than 30 degrees, the pair of artery-vein vessel pair is removed; further, if the distance between the artery vessel segment and the vein vessel segment in the artery-vein vessel pair identified by the algorithm is large, the artery-vein vessel pair has a high probability of being not an artery-vein vessel pair, the artery-vein vessel pair is eliminated, and then step S300d is executed to reserve the rest artery-vein vessel pairs.

It needs to be noted that although the method for differentiating the arteries and the veins of the retinal vessels described above is introduced with the above-mentioned various steps as an example, those skilled in the art should understand that the present disclosure should not be limited thereto. In fact, a user can completely and flexibly set the method for differentiating the arteries and the veins of the retinal vessels according to personal preferences and/or actual application scenes as long as required functions are achieved.

Therefore, by acquiring the vessel extraction image, the fundus image and the optic disc center coordinate, the main vessel is extracted according to the vessel extraction image, the fundus image and the optic disc center coordinate to obtain the main vessel image; multiple single vessel segments are obtained by intercepting the main vessel based on the main vessel image, the diameters of the multiple single vessel segments are measured to obtain diameter sizes of single vessel segments, and the multiple artery-vein vessel pairs are obtained according to the diameter sizes. Therefore, the test effect on a fundus retina color image in an actual scene is excellent, the better effect for the fundus images of different types, different brands and different grades of image quality is achieved, the algorithm robustness and universality are high, and it is possible to apply the artery and vein differentiation of retinal vessels and the diameter measurement algorithm to actual scene.

Figure 16:
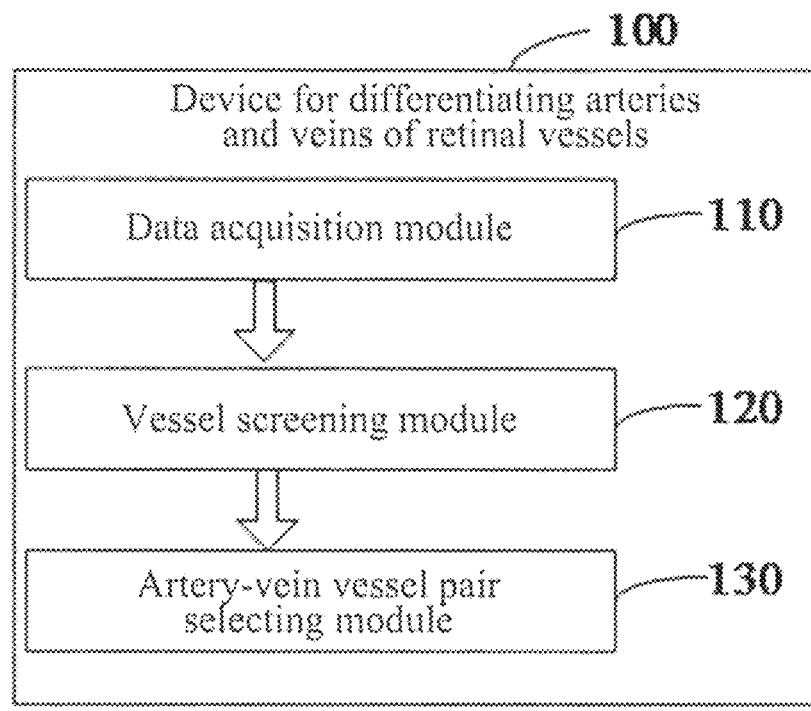
FIG. 16 a structural block diagram of a device for differentiating arteries and veins of retinal vessels in accordance with an embodiment of the present disclosure.

Further, according to another aspect of the present disclosure, a device 100 for differentiating arteries and veins of retinal vessels is further provided. Due to the fact that the working principle of the device 100 for differentiating the arteries and the veins of the retinal vessels according to the embodiment of the present disclosure is the same as or similar to the principle of the method for differentiating the arteries and the veins of the retinal vessels according to the embodiment of the present disclosure, the repetitions are not described in detail here. Referring to FIG. 16, a device 100 for differentiating arteries and veins of retinal vessels according to the embodiment of the present disclosure includes a data acquisition module 110, a vessel screening module 120, and an artery-vein vessel pair selecting module 130.

The data acquisition module 110 is configured to acquire a vessel extraction image, a fundus image, and an optic disc center coordinate.

The vessel screening module 120 is configured to extract a main vessel according to the vessel extraction image, the fundus image and the optic disc center coordinate to obtain a main vessel image, and intercept the main vessel based on the main vessel image to obtain multiple single vessel segments.

The artery-vein vessel pair selecting module 130 is configured to measure diameters of the multiple single vessel segments to obtain diameter sizes of various single vessel segments, and obtain multiple artery-vein vessel pairs according to the diameter sizes.

Figure 17:
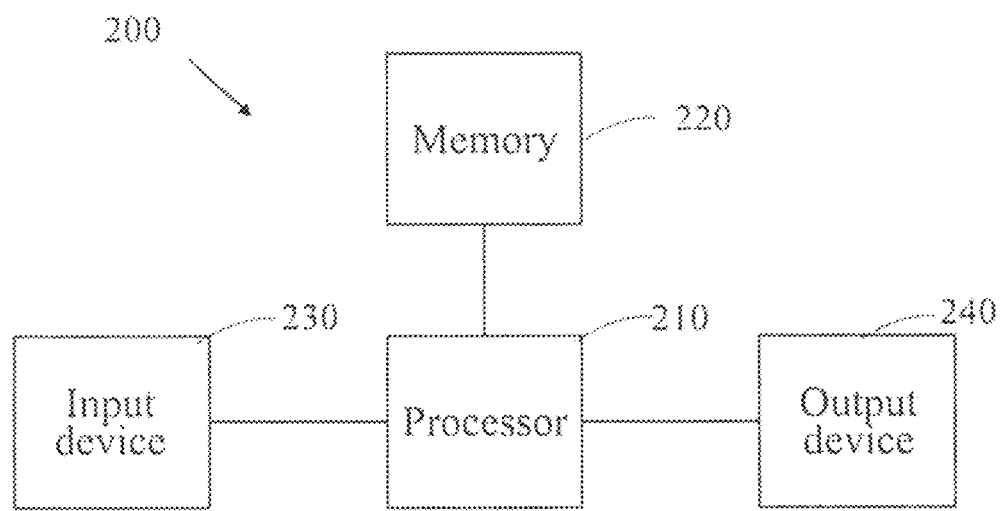
FIG. 17 illustrates a structural block diagram of an apparatus for differentiating arteries and veins of retinal vessels in accordance with an embodiment of the present disclosure.

Furthermore, according to another aspect of the present disclosure, an apparatus 200 for differentiating arteries and veins of retinal vessels is further provided. Referring to FIG. 17, the apparatus 200 for differentiating the arteries and the veins of the retinal vessels of the embodiment of the present disclosure includes a processor 210 and a memory 220 for storing instructions executable by the processor 210. The processor 210 is configured to achieve any of the methods for differentiating the arteries and veins of the retinal vessels mentioned above when executing the executable instructions.

Here, it should be noted that the number of the processor 210 may be one or multiple. Meanwhile, the apparatus 200 for differentiating the arteries and the veins of the retinal vessels according to the embodiment of the present disclosure may further include an input device 230 and an output device 240. The processor 210, the memory 220, the input device 230 and the output device 240 may be connected through a bus, or may be connected through other ways, which is not specifically limited here.

As a computer readable storage medium, the memory 220 may be configured to store software programs, computer executable programs, and various modules, such as, a program or module corresponding to the method for differentiating the arteries and veins of the retinal vessels according to the embodiment of the present disclosure. By operating the software programs or modules stored in the memory 220, the processor 210 can execute various function applications and data processing of the apparatus 200 for differentiating the arteries and veins of the retinal vessels.

The input device 230 may be configured to receive input digitals or signals. The signal may be generate a key signal related to user settings and function control of the apparatus/terminal/server. The input device 240 may include display apparatuses such as a display screen and the like.

According to another aspect of the present disclosure, the present disclosure further provides a non-volatile computer readable storage medium on which computer program instructions are stored, and the computer program instructions are executed by the processor 210 to implement any of the methods for differentiating the arteries and the veins of the retinal vessels mentioned above.

The various embodiments of the present disclosure have been described above, the foregoing description is as exemplary, not exhaustive, and is not limited to the various embodiments disclosed. Many modifications and variations are apparent to those of ordinary skills in the art without departing from the scope and spirit of the described embodiments. The choice of the terminology used herein is intended to best explain the principles, the practical applications of the various embodiments or technical improvement over the marketplace, or to enable others of ordinary skills in the art to understand the various embodiments disclosed herein.

What is claimed is:

1. A method for differentiating arteries and veins of retinal vessels, comprising:
   acquiring a vessel extraction image, a fundus image, and an optic disc center coordinate;
   extracting a main vessel according to the vessel extraction image, the fundus image, and the optic disc center coordinate to obtain a main vessel image, and intercepting the main vessel based on the main vessel image to obtain a plurality of single vessel segments;
   measuring diameters of the plurality of single vessel segments to obtain diameter sizes of the plurality of single vessel segments, and obtaining a plurality of artery-vein vessel pairs according to the diameter sizes;
   eliminating unqualified artery-vein vessel pairs from the plurality of artery-vein vessel pairs, and reserving qualified artery-vein vessel pairs;
   wherein the eliminating unqualified artery-vein vessel pairs comprises:
   acquiring an average image brightness of single vessel segments in each artery-vein vessel pair, and eliminating the unqualified artery-vein vessel pairs from the artery-vein vessel pairs according to the average image brightness for each artery-vein vessel pair;
   wherein the extracting a main vessel according to the vessel extraction image, the fundus image and the optic disc center coordinate comprises:
   removing disconnected vessels in the vessel extraction image to obtain a largest connected vessel;
   extracting a vascular skeleton according to the connected vessel;
   extracting cross points of the vessel skeleton according to the vascular skeleton and removing the cross points; and
   removing small vessel segments and non-main vessel branches of the vascular skeleton according to the optic disc center coordinate and the fundus image to obtain the main vessel;
   wherein during the extracting a vascular skeleton according to the connected vessel, using a skeleton extraction function in OpenCV to extract the vascular skeleton from the connected vessels.

2. The method according to claim 1, wherein the eliminating unqualified artery-vein vessel pairs further comprises:
   acquiring an included angle between an artery vessel and a vein vessel in a pair of vessels of various artery-vein vessel pairs, and eliminating the unqualified artery-vein vessel pairs from the plurality of artery-vein vessel pairs according to the included angle for each artery-vein vessel pair; and
   acquiring a distance between the artery vessel and the vein vessel in the pair of vessels of various artery-vein vessel pairs, and eliminating the unqualified artery-vein vessel pairs from the plurality of artery-vein vessel pairs according to the distance for each artery-vein vessel pair.

3. The method according to claim 1, wherein the extracting cross points of vessels skeleton according to the vascular skeleton and removing the cross points comprise:
   performing binarization on the vascular skeleton to obtain a gray-scale image;
   traversing the gray-scale image with a 3×3 template, and extracting the cross points in the gray-scale image through an enumeration method; and
   setting values of pixels within a circle having a radius of four-pixel points and a center at each cross point to 0.

4. The method according to claim 3, wherein the removing the small vessel segments and non-main vessel branches of the vascular skeleton according to the optic disc center coordinate and the fundus image to obtain the main vessel comprises:
   connecting the optic disc center coordinate and a macular region of the fundus image to obtain a connection line as a positive half axis;
   reserving a region from 110° in a clockwise direction relative to the positive half-axis to 110° in a counter-clockwise direction relative to the positive half axis; and
   refining the gray-scale image by adopting 3×3 ELLIPSE to obtain the main vessel.

5. The method according to claim 1, wherein the intercepting the main vessel based on the main vessel image to obtain a plurality of single vessel segments comprises:
   traversing outwards from a circle center at the optic disc center coordinate within a predetermined radius at a predetermined step, to intercept the main vessel to obtain a plurality of small vessel segments;
   performing convex hull detection on the plurality of small vessel segments to obtain a plurality of smooth vessel segments;
   removing smooth vessel segments with curvatures greater than a predetermined curvature threshold value from the plurality of smooth vessel segments to obtain straight-line vessel segments;
   detecting the straight-line vessel segments by use of a rectangular detection API in the OpenCV to obtain vessel angles; and
   obtaining the plurality of single vessel segments according to a predetermined angle range.

6. The method according to claim 1, wherein the measuring diameters of the plurality of single vessel segments to obtain diameter sizes of the plurality of single vessel segments, and obtaining a plurality of artery-vein vessel pairs according to the diameter sizes comprise:
   obtaining a center line of each single vessel segment, and extending a center point of the center line towards two ends of the single vessel segment by a predetermined pixel to obtain a center line segment;
   computing equations of vertical lines at two end points of the center line segment;
   performing straight-line fitting on one contour line of the single vessel segment between the vertical lines to obtain a first straight-line;
   performing straight-line fitting on another contour line by use of a least square method based on a slope of the first straight-line to obtain a second straight-line;
   computing a distance between the first straight-line and the second straight-line to obtain a vessel diameter;
   selecting a single vessel segment with a maximum diameter in the plurality of the single vessel segments as a vein; and computing a distance between the vein to other single vessel segments, and selecting a single vessel segment closest to the vein as an artery.

7. A device for differentiating arteries and veins of retinal vessels, comprising:
   a data acquisition module, configured to acquire a vessel extraction image, a fundus image, and an optic disc center coordinate;
   a vessel screening module, configured to extract a main vessel according to the vessel extraction image, the fundus image, and the optic disc center coordinate to obtain a main vessel image, and intercept the main vessel based on the main vessel image to obtain a plurality of single vessel segments; and
   an artery-vein vessel pair selecting module, configured to measure diameters of the plurality of single vessel segments to obtain diameter sizes of the plurality of single vessel segments, and obtain a plurality of artery-vein vessel pairs according to the diameter sizes;
   wherein the artery-vein vessel pair selecting module is further configured to eliminate unqualified artery-vein vessel pairs from the plurality of artery-vein vessel pairs, and reserve qualified artery-vein vessel pairs;
   wherein eliminating unqualified artery-vein vessel pairs comprises:
   acquiring an average image brightness of single vessel segments in each artery-vein vessel pair, and eliminating the unqualified artery-vein vessel pairs from the artery-vein vessel pairs according to the average image brightness for each artery-vein vessel pair;
   wherein extracting the main vessel according to the vessel extraction image, the fundus image and the optic disc center coordinate comprises:
   removing disconnected vessels in the vessel extraction image to obtain a largest connected vessel;
   extracting a vascular skeleton according to the connected vessel;
   extracting cross points of the vessel skeleton according to the vascular skeleton and removing the cross points; and
   removing small vessel segments and non-main vessel branches of the vascular skeleton according to the optic disc center coordinate and the fundus image to obtain the main vessel;
   wherein during the extracting a vascular skeleton according to the connected vessel, using a skeleton extraction function in OpenCV to extract the vascular skeleton from the connected vessels.

8. An apparatus for differentiating arteries and veins of retinal vessels, comprising:
   a processor; and
   a memory for storing instructions executable by the processor;
   wherein the processor is configured to achieve a method when executing the executable instructions, comprising:
   acquiring a vessel extraction image, a fundus image, and an optic disc center coordinate;
   extracting a main vessel according to the vessel extraction image, the fundus image, and the optic disc center coordinate to obtain a main vessel image, and intercepting the main vessel based on the main vessel image to obtain a plurality of single vessel segments;
   measuring diameters of the plurality of single vessel segments to obtain diameter sizes of the plurality of single vessel segments, and obtaining a plurality of artery-vein vessel pairs according to the diameter sizes;
   eliminating unqualified artery-vein vessel pairs from the plurality of artery-vein vessel pairs, and reserving qualified artery-vein vessel pairs;
   wherein the eliminating unqualified artery-vein vessel pairs comprises:
   acquiring an average image brightness of single vessel segments in each artery-vein vessel pair, and eliminating the unqualified artery-vein vessel pairs from the artery-vein vessel pairs according to the average image brightness for each artery-vein vessel pair;
   wherein the extracting a main vessel according to the vessel extraction image, the fundus image and the optic disc center coordinate comprises:
   removing disconnected vessels in the vessel extraction image to obtain a largest connected vessel;
   extracting a vascular skeleton according to the connected vessel;
   extracting cross points of the vessel skeleton according to the vascular skeleton and removing the cross points; and
   removing small vessel segments and non-main vessel branches of the vascular skeleton according to the optic disc center coordinate and the fundus image to obtain the main vessel;
   wherein during the extracting a vascular skeleton according to the connected vessel, using a skeleton extraction function in OpenCV to extract the vascular skeleton from the connected vessels.

9. The apparatus according to claim 8, wherein the eliminating unqualified artery-vein vessel pairs further comprises:
   acquiring an included angle between an artery vessel and a vein vessel in a pair of vessels of various artery-vein vessel pairs, and eliminating the unqualified artery-vein vessel pairs from the plurality of artery-vein vessel pairs according to the included angle for each artery-vein vessel pair; and
   acquiring a distance between the artery vessel and the vein vessel in the pair of vessels of various artery-vein vessel pairs, and eliminating the unqualified artery-vein vessel pairs from the plurality of artery-vein vessel pairs according to the distance for each artery-vein vessel pair.

10. The apparatus according to claim 8, wherein the extracting cross points of vessels skeleton according to the vascular skeleton and removing the cross points comprise:
    performing binarization on the vascular skeleton to obtain a gray-scale image;
    traversing the gray-scale image with a 3×3 template, and extracting the cross points in the gray-scale image through an enumeration method; and
    setting values of pixels within a circle having a radius of four-pixel points and a center at each cross point to 0.

11. The apparatus according to claim 10, wherein the removing the small vessel segments and non-main vessel branches of the vascular skeleton according to the optic disc center coordinate and the fundus image to obtain the main vessel comprises:
    connecting the optic disc center coordinate and a macular region of the fundus image to obtain a connection line as a positive half axis;
    reserving a region from 110° in a clockwise direction relative to the positive half-axis to 110° in a counter-clockwise direction relative to the positive half axis; and
    refining the gray-scale image by adopting 3×3 ELLIPSE to obtain the main vessel.

12. The apparatus according to claim 8, wherein the intercepting the main vessel based on the main vessel image to obtain a plurality of single vessel segments comprises:
- traversing outwards from a circle center at the optic disc center coordinate within a predetermined radius at a predetermined step, to intercept the main vessel to obtain a plurality of small vessel segments;
- performing convex hull detection on the plurality of small vessel segments to obtain a plurality of smooth vessel segments;
- removing smooth vessel segments with curvatures greater than a predetermined curvature threshold value from the plurality of smooth vessel segments to obtain straight-line vessel segments;
- detecting the straight-line vessel segments by use of a rectangular detection API in the OpenCV to obtain vessel angles; and
- obtaining the plurality of single vessel segments according to a predetermined angle range.

13. The apparatus according to claim 8, wherein the measuring diameters of the plurality of single vessel segments to obtain diameter sizes of the plurality of single vessel segments, and obtaining a plurality of artery-vein vessel pairs according to the diameter sizes comprise:
- obtaining a center line of each single vessel segment, and extending a center point of the center line towards two ends of the single vessel segment by a predetermined pixel to obtain a center line segment;
- computing equations of vertical lines at two end points of the center line segment;
- performing straight-line fitting on one contour line of the single vessel segment between the vertical lines to obtain a first straight-line;
- performing straight-line fitting on another contour line by use of a least square method based on a slope of the first straight-line to obtain a second straight-line;
- computing a distance between the first straight-line and the second straight-line to obtain a vessel diameter;
- selecting a single vessel segment with a maximum diameter in the plurality of the single vessel segments as a vein; and
- computing a distance between the vein to other single vessel segments, and selecting a single vessel segment closest to the vein as an artery.

* * * * *